United States Patent [19]

Tanno

[11] Patent Number: 4,630,303
[45] Date of Patent: Dec. 16, 1986

[54] SPEAKER SYSTEM HAVING A MOVABLE HIGH RANGE UNIT

[75] Inventor: Toshihiro Tanno, Yamagata, Japan

[73] Assignee: Pioneer Electronic Corporation, Tokyo, Japan

[21] Appl. No.: 657,279

[22] Filed: Oct. 3, 1984

[30] Foreign Application Priority Data

Oct. 3, 1983 [JP] Japan ............................ 58-153614[U]

[51] Int. Cl.⁴ .............................................. H04R 1/02
[52] U.S. Cl. ........................................ 381/87; 381/24; 381/86; 381/188; 181/145
[58] Field of Search ...................... 381/86, 87, 88, 24; 179/146 E; 181/141, 143, 145, 150

[56] References Cited

U.S. PATENT DOCUMENTS 4,441,577 4/1984 Kurihara .............................. 381/86

Primary Examiner—Forester W. Isen
Attorney, Agent, or Firm—Sughrue, Mion, Zinn, Macpeak and Seas

[57] ABSTRACT

A speaker system for automotive car stereo sets, includes a high range unit, a low range unit and a body for receiving the high range unit and the low range unit. The high range unit is movable to a desired height with respect to a retracted position. Upon the movement of the high range unit, a slant angle of the high range unit is varied so that a sound generated from the high range unit is directed to a driver or passenger sitting on his seat.

10 Claims, 6 Drawing Figures

SPEAKER SYSTEM HAVING A MOVABLE HIGH RANGE UNIT

BACKGROUND OF THE INVENTION

This invention relates to a speaker system having a high range unit for automotive car stereo sets.

In a conventional speaker system of this type for car stereo sets, a high range unit is fixedly mounted at the same level as that of a low and middle range unit. Therefore, when, as shown in FIG. 1, the speaker system A is mounted on a rear tray of the vehicle, a sound emitted from the high range unit, which sound has a remarkable directionability, is collided with a rear seat C. Thus, there is a disadvantage that an attenuated high range sound is heard without enjoying a satisfactory sound quality.

SUMMARY OF THE INVENTION

An object of the present invention is to overcome the above-noted defect.

According to the present invention, there is provided a speaker system for automotive car stereo sets, including a high range unit, a low range unit and a body for receiving the high range unit and the low range unit, comprising means for moving, with respect to said body, the high range unit up and down with a slant angle thereof being changed, and driving source for selectively driving the high range unit. Thus, the sound emitted from the high ranged unit will not collide with a rear seat, a backrest or a head rest of a vehicle when the speaker system is mounted on a rear tray of the vehicle.

DESCRIPTION OF THE PREFERRED EMBODIMENTS

Figure 1:
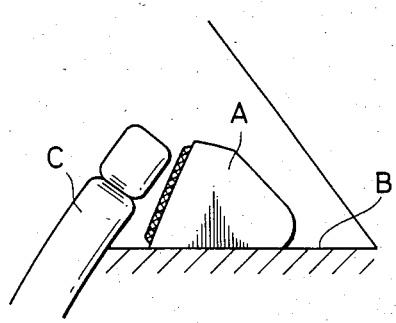
FIG. 1 is a side view of a speaker system of the prior art.
Figure 2:
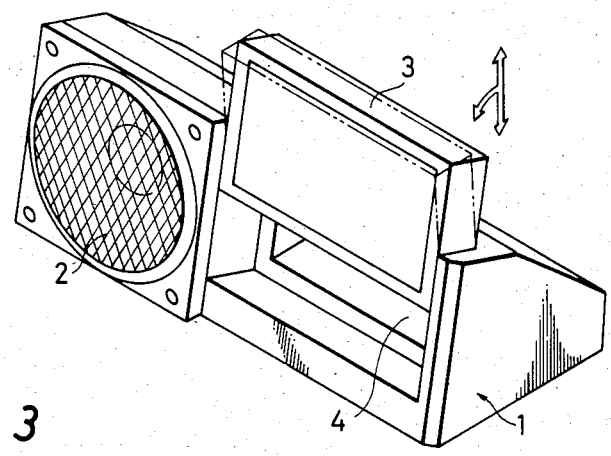
FIG. 2 is a perspective view showing one embodiment of the present invention.
Figure 3:
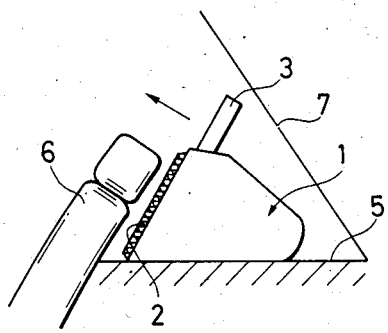
FIG. 3 is a side view of the speaker system of the embodiment of the invention, in use.

One embodiment of the present invention will now be described with reference to the accompanying drawings. FIG. 2 is a perspective view showing a speaker system for car stereo sets in accordance with the present invention. FIG. 3 is an illustrative view of the speaker system in use. On a lefthand side of a system body 1, there is mounted in a stationary manner a speaker unit 2. Also, on a righthand side of the body 1, there is mounted a high range unit 3 which is movable up and down and is slantable toward the front side when elevated. Also, when the high range unit 3 is raised upwardly, a bass reflex duct 4 is exposed to the outside. Several components of the vehicle such as a rear tray 5, a rear seat 6 and window 7 are shown in FIG. 3.

Figure 4:
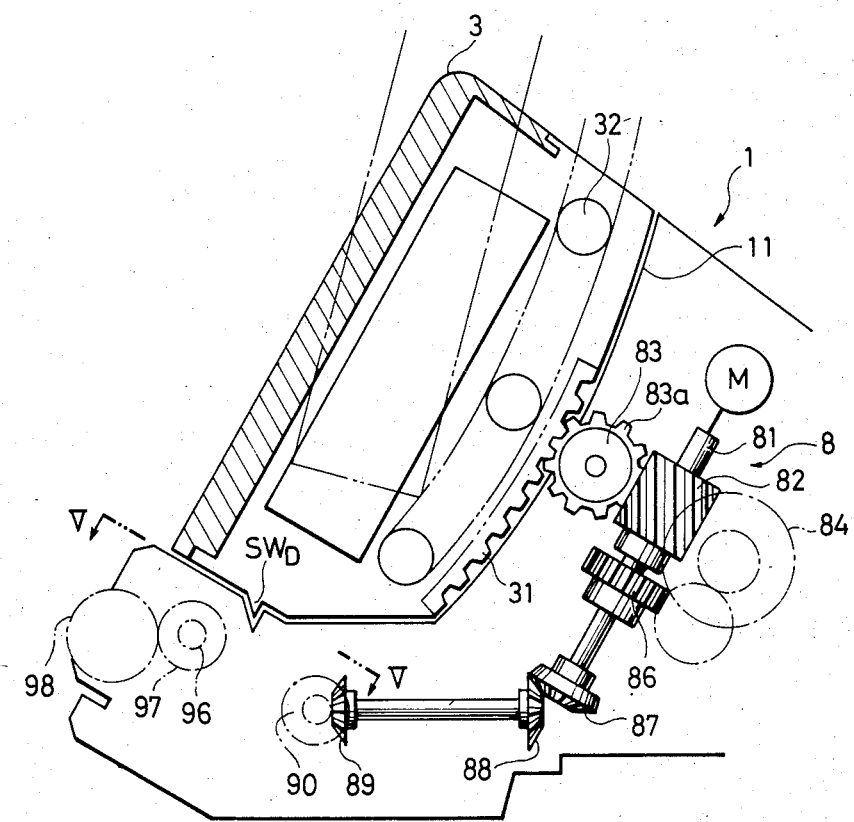
FIG. 4 is an enlarged cross-sectional view of the speaker system in a schematic manner.

More specifically, FIG. 4 shows an enlarged cross-sectional view of the movable speaker system 3 in the retracted state in the body 1. FIG. 4 schematically shows an arrangement for a power drive and transmission means 8. A reversible motor M has a drive shaft 81 around which is fixedly secured a helical gear 82 which is engaged with a gear means 83 on one side for drive power transmission and a gear means 84 on the other side for rising movement control of the high range unit 3. Namely, the rotation of the gear means 83 is synchronous with the rotation of the gear means 84. The gear means 83 is provided with suitable gear teeth which engage with a rearwardly arcuate or convex rack 31 formed on the backside of the high range unit 3 as shown in FIG. 4. A bearing means is provided between the high range unit 3 and the stationary body 1 in any well known manner in the art. With such a drive and transmission mechanism, the high range unit 3 may be raised as desired, as shown by dot-and-dash lines in FIG. 4. In this case, the high range unit is raised while slanting forwardly along with the arcuate path defined between the rear side of the high range unit and a sliding surface 11 of the body 1.

Figure 5:
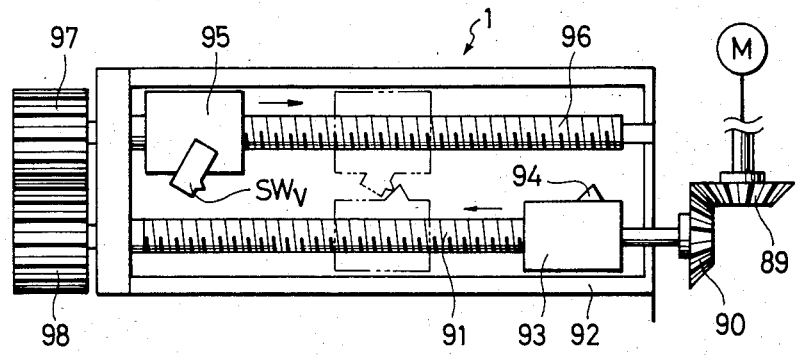
FIG. 5 is a slant view showing a height selection means used in the speaker system as viewed from a line V—V of FIG. 4.

On the other hand, the gear means 84 has a speed reduction function and its output torque is transmitted through a gear 86, a bevel gear 87 rotated together with the gear 86, and an associated bevel gear 88 to an output bevel gear 89. The output bevel gear 89 is engaged with a bevel gear 90 which is secured to a threaded shaft 91 suitably rotatably supported in a box-shaped housing 92 fixed to the body 1 as best shown in FIG. 5. A movable box or member 93 is threadedly engaged with the threaded shaft 91 while being slidingly supported in one inner wall of the housing 1. The movable box 93 has a projection 94 for actuating an upper limit switch $SW_V$ to be closed. The upper limit switch $SW_V$ is mounted on a movable box or member 95 which is similarly engaged with another threaded shaft 96 extending in parallel with the shaft 91. The shaft 96 is rotatably supported by the housing 92 to project at one end 97. At that end 97, a suitable gear train is provided so that its final gear 98 is projected to some extent to the outside of the body 1 for manual operation.

The retracted and down position of the high range unit is controlled by a lower limit switch $SW_D$ provided as shown in FIG. 4. In the retracted position, the lower limit switch $SW_D$ is kept open by a projection formed on a bottom surface of the high range unit 3.

Figure 6:
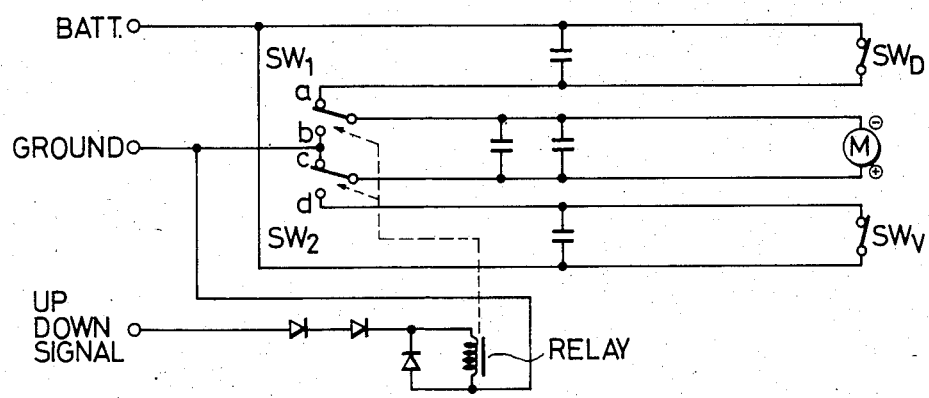
FIG. 6 is a circuit diagram used in the speaker system according to the present invention.

FIG. 6 is a circuit diagram for controlling the up and down movement of the high range unit. In the figure, a relay is provided which is actuated in response to an up/down signal fed through diodes. Change-over switches $SW_1$ and $SW_2$ are ganged with each other and provided in association with the relay.

In operation, the system body 1 is fixedly mounted on the rear tray 5 of the vehicle. Subsequently, if the high range unit 3 is raised upwardly while being slanted toward the front side, then a sound emitted from the high range unit 3 is not collided with the rear seat 6. Therefore, the high range sound is not attenuated and, at the same time, the low frequency sound characteristics are improved through the bass reflex duct 4. In this case, it is possible to tune the low frequency sound at an optimum condition as desired, by adjusting the rising amount of the high range unit or the forward slant amount thereof.

More specifically, when the roll gear 98 is manually rotated from the outside by the operator for setting the high range unit to a desired level, the box 95 is moved axially, for example, as shown by dotted lines in FIG. 5. It is preferable that the box 95 is provided with an LED indicator which is moved together with the box 95 and can be seen from the outside. Then, the other box 93 is moved to a position, as shown by dotted lines in FIG. 5, in a manner described later.

When in the retracted position, the motor M is rotated, a transmission torque is transmitted from its output shaft 81 through the gear means 83 to the rack means 31 to thereby raise the high range unit 3 upwardly and slantingly as shown by dot-and-dash lines in FIG. 4. On the other hand, the rotational torque is transmitted from the motor M through the reduction gear means 84, the gear assembly 86, 87, 88, 89, to the threaded shaft 91. The rotation of the threaded shaft 91 is continued up to the position where the box 93 is aligned with the other box 95 to open the upper limit switch $SW_V$.

Referring again to FIG. 6, in the absence of the up-/down signal, the switches $SW_1$ and $SW_2$ are in contacts a and c, respectively. In this condition, the high range unit is in the down or retracted position and a down limiter switch $SW_D$ is being actuated so as to open its contact whereas an upper limiter switch $SW_V$ is being closed, whereby a motor for moving the high range unit is disconnected from a battery and the high range unit remains in the retracted or down position.

When the up/down signal is applied to the relay, the switches $SW_1$ and $SW_2$ are switched from the contacts a and c to b and d, respectively. Then, the motor starts rotating in a first direction so that the high range unit is moved in an upper direction. Upon the high range unit reaching the uppermost position, the upper limiter switch $SW_V$ is actuated so as to open its contact. As a result, the motor is disconnected from the battery and ceases its rotation.

In the condition that the high range unit is in the raised position, when another up/down signal is received, the switches $SW_1$ and $SW_2$ are again switched to the contacts a and c, respectively, in accordance with the actuation of the relay. In this condition, since the down limiter switch $SW_D$ is being closed, the motor is again connected to the battery with the polarities being reversed. The motor rotates in a second direction opposite to the first direction, whereby the high range unit is lowered. When the high range unit is moved down to the lowermost position, the down limiter switch $SW_D$ is actuated so as to open its contact. The motor M is thus disconnected from the battery and ceases its rotation.

As described above, in accordance with the present invention, the high unit 3 mounted on the system body 1 may be moved up and down and is slanted forwardly. Therefore, the sound emitted from the high range unit 3 is not collided with the rear seat 6 whereby the attenuation of the sound of high range is prevented.

I claim:

1. A speaker system for automotive car stereo sets, including a high range unit for propagating sound in a sound propagation direction, a low range unit, a body for receiving the high range unit and the low range unit, said speaker system comprising:
    means responsive to a driving force for moving said high range unit with respect to said body in a direction transverse to said sound propagation direction with a slant angle thereof being changed, and
    means for selectively providing said driving force to said moving means to thereby move said high range unit.

2. The speaker system according to claim 1, further comprising torque transmission means for transmitting a torque of said driving means in a predetermined manner.

3. The speaker system according to claim 2, further comprising a rack means provided for said high range unit, and a rising height selecting means for selecting a height from a retracted position where said range unit is received in said housing to a desired raised position.

4. The speaker system according to claim 3, wherein said rising height selecting means comprises a pair of rotatable shafts, and first and second members threadedly engaged around said pair of rotatable shafts, respectively, said first member being movable to a desired position representative of a desired rising height of said high range speaker and said second member being movable by the torque transmitted from said transmission means.

5. A speaker system for automotive car stereo sets, including a high range unit for propagating sound in a sound propagation direction, a low range unit, a body for receiving the high range unit and the low range unit, said speaker system comprising:
    means responsive to a driving force for moving said high range unit with respect to said body in a direction transverse to said sound propagation direction with a slant angle thereof being changed;
    means for selectively providing said driving force to said moving means to thereby move said high range unit;
    torque transmission means for transmitting a torque of said driving means in a predetermined manner;
    rack means provided for said high range unit; and
    rising height selecting means for selecting a height from a retracted position where said range unit is received in said housing to a desired raised position, said rising height selecting means including a pair of rotatable shafts, and first and second members threadedly engaged around said pair of rotatable shafts, respectively, said first member being movable to a desired position representative of a desired rising height of said high range speaker and said second member being movable by the torque transmitted from said transmission means, and said second member being movable in synchronism with said rack means provided for said high range unit.

6. The speaker system according to claim 5, further comprising control means for controlling the movement of said high range unit to the desired rising height.

7. The speaker system according to claim 6, wherein said control means includes an upper limit switch for restricting the upward movement of said high range unit to said desired rising height and a lower limit switch for restricting the downward movement of said high range unit to said retracted position.

8. The speaker system according to claim 1, wherein said upper limit switch is provided on said second member, and said first member is provided with a projection for actuating said upper limit switch.

9. A speaker system for automotive car stereo sets, including a high range unit for propagating sound in a sound propagation direction, a low range unit, a body for receiving the high range unit and the low range unit, said speaker system comprising:
    means responsive to a driving force for moving said high range unit with respect to said body in a direction transverse to said sound propagation direction with a slant angle thereof being changed;

means for selectively providing said driving force to said moving means to thereby move said high range unit;

torque transmission means for transmitting a torque of said driving means in a predetermined manner; and a base reflex duct defined by a bottom of said high range unit when said high range unit is raised.

10. A speaker system for automotive car stereo sets, including a high range unit for propagating sound in a sound propagation direction, a low range unit, a body for receiving the high range unit and the low range unit, said speaker system comprising:

means for moving said high range unit with respect to said body in a direction transverse to said sound propagation direction with a slant angle thereof being changed, said means for moving including a rack means comprising an arcuate rack which is convex rearwardly;

means for selectively providing said driving force to said moving means to thereby move said high range unit; and torque transmission means for transmitting a torque of said driving means in a predetermined manner.

* * * * *